UNITED STATES PATENT OFFICE.

CHARLES GERHARD, OF JERSEY CITY, NEW JERSEY.

PYROTECHNIC COMPOUND.

SPECIFICATION forming part of Letters Patent No. 534,557, dated February 19, 1895.

Application filed October 11, 1894. Serial No. 525,611. (No specimens.)

*To all whom it may concern:*

Be it known that I, CHARLES GERHARD, a citizen of the United States, residing at Jersey City, in the county of Hudson and State of New Jersey, have invented new and useful Improvements in Pyrotechnic Compounds, of which the following is a specification.

This invention relates to a composition of matter to be used for the manufacture of fire works.

My composition consists of the following ingredients, combined in substantially the proportions stated; one and one half (1½) pounds metallic magnesium; four (4) pounds starch, one (1) pound lampblack, one (1) pound iron by alcohol, one half (½) a pound camphor dissolved in alcohol, one and one half (1½) pounds adhesive dissolved in water.

The compound is prepared as follows: I take one pint of alcohol and dissolve one half a pound of camphor therein, then add one pound of lampblack, constantly stirring or mixing. Then I add the solution of adhesive and mix into these ingredients the remaining ingredients. The adhesive is composed of three parts of gum tragacanth and two parts of glue which when dissolved in water and heated until the resulting mass is of a pasty consistence will form an adhesive of great efficiency and readily soluble or capable of dilution by water.

The mixture should have a pasty consistency, so as to be readily adherent, and should the mixture at any time become too consistent or thick, a sufficient addition of water will properly dilute the same. Into this mixture or pasty mass I dip splints or stalks of wood or other material so that the mass adheres to the stalks, and I then allow the mass to become thoroughly dry, and the stalks can then be held by their undipped portion and the adhering mass ignited.

When burning the mass gives off a bright light emitting sparks or stars.

What I claim as new, and desire to secure by Letters Patent, is—

1. The herein described composition of matter to be used for pyrotechnic purposes, consisting of magnesium, starch, lampblack, iron, camphor and gum tragacanth and glue substantially in the proportion specified.

2. The herein described method of manufacturing a pyrotechnic compound, which method consists in dissolving camphor in alcohol, mixing lampblack therewith, adding gum tragacanth and glue to the mixture, and mixing into these ingredients magnesium, starch and iron substantially as set forth.

In testimony whereof I have hereunto set my hand in the presence of two subscribing witnesses.

CHARLES GERHARD.

Witnesses:
WM. C. HAUFF,
E. F. KASTENHUBER.